United States Patent
Arora et al.

(10) Patent No.: US 6,199,144 B1
(45) Date of Patent: Mar. 6, 2001

(54) METHOD AND APPARATUS FOR TRANSFERRING DATA IN A COMPUTER SYSTEM

(75) Inventors: Judge K. Arora, Cupertino; William R. Bryg, Saratoga; Stephen G. Burger, Santa Clara; Gary N. Hammond; Michael L. Ziegler, both of Campbell, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/001,336

(22) Filed: Dec. 31, 1997

(51) Int. Cl.[7] .................................................. G06F 12/00
(52) U.S. Cl. .......................... 711/145; 711/130; 711/144; 711/147
(58) Field of Search ..................................... 711/124, 130, 711/147, 144, 145

(56) References Cited

U.S. PATENT DOCUMENTS

| 5,551,005 | * | 8/1996 | Sarangdhar et al. | 711/145 |
| 5,715,428 | * | 2/1998 | Wang et al. | 711/141 |
| 5,748,938 | * | 5/1998 | Kahle | 711/138 |

* cited by examiner

Primary Examiner—Do Hyun Yoo
Assistant Examiner—Nasser Moazzami
(74) Attorney, Agent, or Firm—David J. Kaplan

(57) ABSTRACT

A method and apparatus for transferring data from a first memory location to a second memory location in a computer system. A load instruction is executed, and, in response, data is transferred from a first memory location to a second memory location during a single bus transaction. During the same bus transaction, a request is made to invalidate a copy of the data that is stored in a third memory location if the load instruction indicates to do so.

20 Claims, 3 Drawing Sheets

·

·

·

LOAD_SHARE [R(x)] → R(a)

LOAD_EXCLUSIVE [R(y)] → R(b)

ADD R(a) + R(b) → R(b)

STORE R(b) → [R(y)]

·

·

·

METHOD AND APPARATUS FOR TRANSFERRING DATA IN A COMPUTER SYSTEM

FIELD OF THE INVENTION

The present invention relates to computer systems and more particularly to transferring data from a first memory location to a second memory location in a computer system under software control.

BACKGROUND OF THE INVENTION

A processor is commonly considered to be the "brains" of a computer system. To increase the processing power of a computer system, some systems contain more than one processor. These computer systems are referred to as multiprocessor computer systems. The processors in these systems typically share memory so that two or more processors have access to the same data in a particular memory address space. Even in computer systems that contain only a single processor, the processor may share memory with a peripheral device, such as a bus master, that also has access to the memory. Sharing memory in this manner necessitates a memory coherence protocol to ensure that all of the devices with access to the shared memory have the same view of the data in memory. For example, once one device updates a particular data value, the other devices must be able to access the updated data value for their own use.

Suppose a first processor in a multiprocessor system loads a data value from an address in a shared memory location, such as a shared cache, into the first processor's own dedicated memory, such as a local cache, during a first bus transaction. If a second processor in the system loads the same data value from the address in the shared memory location into its own local cache, each processor will have a copy of the same data value stored in its local cache.

Initially, the data values are brought into the local caches of each of the two processors in a shared state. This means that there is an indicator corresponding to the data value, such as one or more flag bits in the cache line containing the data value, that indicates to the processor that another device in the computer system may contain a cached copy of the same data value.

Assume that the second processor uses the data value as an operand in various lines of program code, but does not modify the data value. Meanwhile, the first processor modifies the data value by, for example, performing a mathematical operation on the data value. The first processor then stores the modified data value in the same address as the original data value. Once the data value is modified by the first processor, the second processor must no longer continue to use the older, invalid data stored in the second processor's local cache or else the results of the second processor's operations may be erroneous.

To prevent the second processor from using the older copy of the data value, the data value in the second processor's local cache is invalidated. Invalidation of the data value is requested during a separate bus transaction by the first processor before the first processor modifies its copy of the data value. This request causes the second processor to invalidate its copy of the data value by, for example, setting one or more indicator bits in the cache line containing the data value.

After the first processor requests invalidation of other copies of the data value, the state of the data value stored in the first processor's local cache is changed from a shared state to an exclusive state. This means that the indicator corresponding to the data value, such as one or more flag bits in the cache line containing the data value, is changed to indicate that no other device in the computer system contains a (valid) copy of the same data value.

Once the data value in the first processor transitions from a shared state to an exclusive state, the first processor is free to modify the data value. This new, updated data value is stored in the original address in the shared memory location of the computer system. When the second processor next needs the data value, the second processor will re-access the new, updated data value from the shared memory location and pull this updated data value back into the second processor's local cache in a shared state.

One problem with the above-described cache coherency protocol is that the first processor must wait for a relatively long time before the first processor can modify or otherwise update the data value and store the updated data value in the original address location. The first processor must first bring the data value into its local cache in the shared state during a first bus transaction, then broadcast a request to invalidate other copies of the data value during a second bus transaction, and then transition the data value to the exclusive state before updating the data value.

SUMMARY OF THE INVENTION

A method and apparatus is described for transferring data from a first memory location to a second memory location in a computer system. A load instruction is executed, and, in response, data is transferred from a first memory location to a second memory location during a single bus transaction. During the same bus transaction, a request is made to invalidate a copy of the data that is stored in a third memory location if the load instruction indicates to do so.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

A method and apparatus is described for loading data in an exclusive state into a local cache of a first processor of a computer system. For one embodiment in which the present invention is implemented on a multiprocessor computer system, the computer system includes a shared cache, a first processor having a local cache, a second processor having a local cache, and a system bus that couples the first processor to the second processor.

During the execution of program code, the first processor encounters an exclusive load instruction. The exclusive load instruction instructs the first processor to load a data value into the local cache of the first processor in an exclusive state. In response, the first processor, during a single bus transaction (called a "request for ownership" bus transaction), transfers the data value from the shared cache to the first processor's local cache and broadcasts an invalidation request on the system bus. The invalidation request includes the address of the data value and requests that any copies of the data value stored in other local caches of the multiprocessor system be invalidated. In response to this request, a copy of the data value that is stored in the local cache of the second processor is invalidated.

Because the data value is stored in the local cache of the first processor in the exclusive state, the first processor can immediately update or otherwise modify the data value by storing a new value in its address. The processor does not need to wait while broadcasting an invalidation request during a subsequent bus transaction to change the state of the data value from shared to exclusive before updating the data value. Therefore, the processing speed is increased.

For an alternate embodiment, the present invention is implemented in a uniprocessor system. For this embodiment, a copy of the data value that is stored in a bus master of the computer system is invalidated in response to the invalidation request by the first processor. A more detailed description of embodiments of the present invention, including various configurations and implementations, is provided below.

Figure 1:
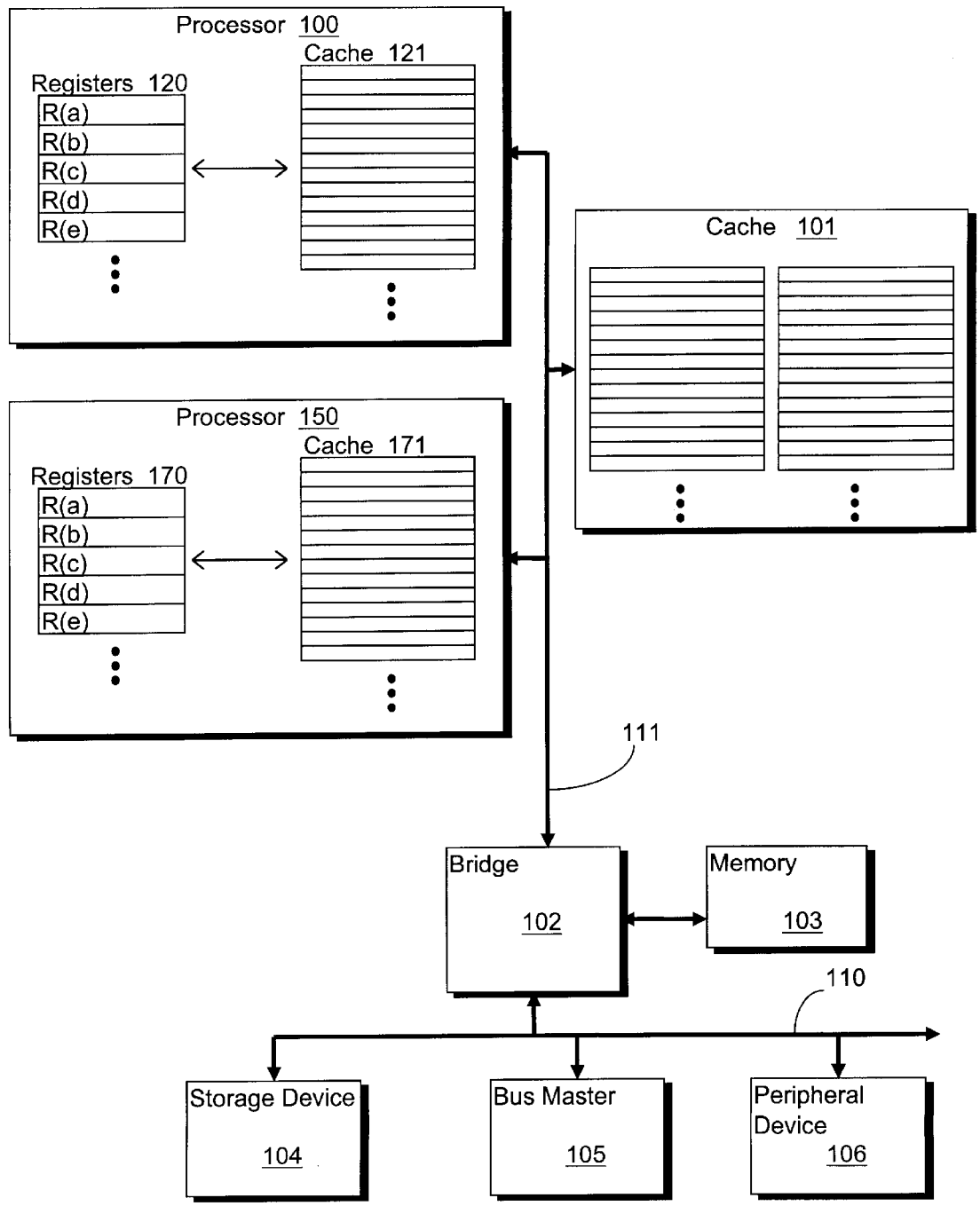
FIG. 1 is a computer system formed in accordance with an embodiment of the present invention.

FIG. 1 is a multiprocessor computer system formed in accordance with an embodiment of the present invention in which processor 100 includes a set of registers 120 and a local cache 121. Processor 100 is coupled to processor 150 via a system bus 111. Processor 150 includes a set of registers 170 and a local cache 171. A shared cache 101 is also coupled to system bus 111. Bridge 102 couples system bus 111 to memory 103 and to bus 110 to which storage device 104, bus master 105, and peripheral device 106 are coupled.

Processor 100 of FIG. 1 includes circuitry to transfer data between registers 120 and cache 121, and processor 150 includes circuitry to transfer data between registers 170 and cache 171. When either processor 100 or 150 is instructed to load a data value, the processor loads the data value into both a register and into the processor's local cache along with other data in the cache line. In accordance with one embodiment of the present invention, a parameter in the load instruction indicates to the processor what state, shared or exclusive, the cache line (including the data value) is to be stored in the local cache. As used herein, the state of a cache line is also considered to be the state of any data value within the cache line. Similarly, the validity of a cache line (valid or invalid) is also considered to be the validity of any data value within the cache line. For one embodiment of the present invention, a data value is 8 bytes wide (64 bits) and is contained in a cache line that is 32 bytes wide. For another embodiment, the cache line is any number of bits in width and the data value is equal to or less than the width of the cache line.

For one embodiment of the present invention, an exclusive load instruction is executed by processor 100 of FIG. 1. This exclusive load instruction is a line of program code that is initially stored in a storage device, 104. Storage device 104 may include any electronic storage medium such as a floppy disk, hard drive, CD-ROM, DVD, or a solid state storage medium such as a flash device or other electrically programmable storage medium. In accordance with one embodiment of the present invention, the exclusive load instruction is transferred from storage device 104, to memory 103, which is the main memory of the computer system. The instruction is then transferred from memory 103 to shared cache 101 and then to local cache 121 of processor 100 before being executed by processor 100.

The exclusive load instruction instructs processor 100 of FIG. 1 to load a data value from a memory location and store it in local cache 121 (as well as in one of registers 120) in processor 100 in an exclusive state. The specific memory location from which the data value is loaded is provided to processor 100 as a parameter in the line of program code that includes the exclusive load instruction. In accordance with one embodiment of the present invention, the memory location of the data value is in shared cache 101. For an alternate embodiment, the data value is stored in memory 103.

In response to executing the exclusive load instruction, processor 100 of FIG. 1 causes the data value, along with the rest of the cache line in which the data value resides, to be transferred from cache 101 into local cache 121. This transfer takes place across system bus 111 during a single request for ownership bus transaction. A bus transaction is a period of time during which the bus owner is able to send or receive information across the bus without having to re-request ownership of the bus from the bus arbiter. Once processor 100 wins ownership of system bus 111, the bus transaction starts, and once processor 100 relinquishes ownership of system bus 111, the bus transaction stops. As used herein, a processor that causes an event to occur in response to the execution of an instruction is said to perform that event itself.

During the same bus transaction in which the data value is transferred to local cache 121 of processor 100 of FIG. 1, an invalidation request is broadcast over system bus 111. For one embodiment of the present invention, the invalidation request includes the address of the cache line that contains the data value. The request also instructs other processors coupled to system bus 111 to invalidate their copies of the cache line that may be stored in their local caches. For example, for one embodiment of the present invention, a copy of the data value is stored in local cache 171. Processor 150, in response to the request for invalidation, invalidates its copy of the data value in local cache 171. For one embodiment of the present invention, processor 100 broadcasts the invalidation request. For another embodiment, bridge 102 broadcasts the invalidation request.

Once the invalidation request has been broadcast over system bus 111 of FIG. 1, processor 100 gains exclusive ownership of the data value in local cache 121. This exclusive ownership is indicated by the exclusive state of the cache line containing the data value. Processor 100 is then free to modify or otherwise update the data value, including entirely replacing the data value with a new value, and may store the modified data value back into its original address in local cache 121, shared cache 101, or memory 103. For an alternate embodiment of the present invention, a request for invalidation of a copy of the data value stored in local cache 171 is made before processor 100 stores the data value in cache 121. For another embodiment, additional processors or other devices with local caches or other memories receive the invalidation request and, in response, invalidate any local copies of the data value.

Because the older, unmodified copy of the data value in local cache 171 of processor 150 is invalidated, processor 150 cannot use this data value as an operand in instructions subsequently executed by processor 150. Instead, processor 150 transfers the updated, modified data value back into its local cache 171 from either shared cache 101 or memory 103 after processor 100 stores the modified data value back into one of these memory locations. Then processor 150 can use the modified data value in its local cache 171. For one embodiment of the present invention, processor 150, in response to executing another exclusive load instruction, requests exclusive ownership of the modified data value. For this embodiment, processor 100 may invalidate its local cached copy of the modified data value during the same bus transaction in which processor 100 provides the data value to processor 171.

For another embodiment of the present invention, a shared load instruction is also executed by processor 100 of FIG. 1. The shared load instruction instructs processor 100 of FIG. 1 to load another data value from a memory location, storing it in the local cache of processor 100 in a shared state. The specific memory location from which the data value is loaded is provided to processor 100 as a parameter in the line of program code that includes the shared load instruction. In accordance with one embodiment of the present invention, the memory location of the data value is in memory 103. For an alternate embodiment, the data value is stored in shared cache 101.

In response to executing the shared load instruction, processor 100 of FIG. 1 transfers the data value, along with the rest of the cache line in which the data value resides, from memory 103, through bridge 102, across system bus 111, and into local cache 121. In accordance with one embodiment of the present invention, the data value that is loaded by the shared load instruction is stored in the same page as a data value that is loaded by the exclusive load instruction described above. A page is a block of data in a memory address space that, for efficiency, is transferred as a group to and from different memory locations, such as between a magnetic disk and a main memory. For an alternate embodiment, the data values are stored in different pages.

Allowing different data values within the same page to be selectively loaded into a local cache in either a shared or exclusive state improves data sharing optimization between processors in a multiprocessor system versus a page level scheme. In accordance with an alternate embodiment of the present invention, a page level scheme is used in which all data values from a particular page of memory, when loaded into a local cache, are loaded in an exclusive state (i.e. no shared copies of the data values are permitted).

Once the data value has been stored in local cache 121 of processor 100 in FIG. 1, processor 100 shares ownership of the data value with any other device that has a copy of the data value stored in its local cache. For example, processor 150 may load a copy of the same data value into its local cache 171 in a shared state. No request for invalidation is broadcast over system bus 111 upon loading the data value in a shared state. This shared ownership is indicated by the shared state of the cache line containing the data value. Processor 100 is then free to read and use the data value in registers 120, but cannot write a modified data value back into the original address unless the state of the data value is changed from shared to exclusive by, for example, requesting invalidation of the copy of the data value in local cache 171.

In accordance with an alternate embodiment of the present invention, bus master 105 of FIG. 1 includes a local memory having a copy of a shared data value stored therein. When processor 100 broadcasts an invalidation request over system bus 111, bridge 102 transfers this request down to peripheral bus 110. Upon receiving the invalidation request, the data value copy stored in bus master 105 is invalidated if its address matches the address of the request. For an alternate embodiment, peripheral device 106 is a target device that also includes memory space having a copy of the data value stored therein. This data value may also be invalidated in response to the invalidation request. For another embodiment, the present invention is implemented in a uniprocessor computer system (a computer system having a single processor).

Figure 2:
FIG. 2 is a portion of program code in accordance with an embodiment of the present invention.

FIG. 2 is a portion of program code in accordance with an embodiment of the present invention. Program code 200 has been written for a processor having an instruction set that accepts both exclusive load and shared load instructions. Program code 200 is stored in an electronic storage medium such as magnetic disk, optical disk, or a solid state storage device. For example, for one embodiment, program code 200 is stored in storage device 104 of FIG. 1. From storage device 104, program code 200 is transferred to memory 103, then to cache 101, then to local cache 121 before being executed by processor 100.

Shared load instruction LOAD_SHARE [R(x)]→R(a) instructs the processor to load the data value at address location [R(x)] into register R(a), as well as into the local cache of the processor (as a portion of the full cache line) in a shared state. Exclusive load instruction LOAD_EXCLUSIVE [R(y)]→R(b) instructs the processor to load the data value at address location [R(y)] into register R(b), as well as into the local cache of the processor in an exclusive state. Add instruction ADD R(a)+R(b)→R(b) instructs the processor to add the data value stored in register R(a) to the data value stored in register R(b) and to store the result in register R(b). Store instruction STORE R(b)→[R(y)] instructs the processor to write the result of the add operation stored in register R(b) to address location [R(y)].

In accordance with an embodiment of the present invention, the programmer that writes program code 200 of FIG. 2 recognizes that the data value stored in address location [R(y)] will be modified by the subsequent add and store instructions. Therefore, the programmer uses an exclusive load instruction, LOAD_EXCLUSIVE [R(y)]→R(b), rather than a shared load instruction, to load the data value at [R(y)] into the local cache of the processor. In doing so, the programmer reduces the number of bus transactions that the processor must initiate to carry out the instructions.

For example, if the programmer had used a shared load instruction to load the data value at address [R(y)], the processor that executes the instruction would initiate a first bus transaction to load the data value in a shared state. The processor would then initiate a second bus transaction to broadcast an invalidation request to change the state of the data value to an exclusive state before storing the modified data value back into address [R(y)]. In accordance with an embodiment of the present invention, initially bringing the data value into the local cache of the processor in an exclusive state using the exclusive load instruction reduces these two bus transactions into one. As a result, the speed of execution of program code 200 is increased.

In accordance with another embodiment of the present invention, the programmer that writes program code 200 of FIG. 2 recognizes that the data value stored in address location [R(x)] will not be modified by the subsequent instructions. The data value stored in address location [R(x)] is only read into register R(a) and used as an operand in a subsequent mathematical instruction, ADD R(a)+R(b)→R(b). Therefore, the programmer uses a shared load instruction, LOAD_SHARE [R(x)]→R(a), rather than an exclusive load instruction, to load the data value at [R(x)]

into the local cache of the processor. In doing so, the programmer allows other devices in the computer system to maintain their own locally cached copies of the data value at [R(x)] to improve the speed of these other devices.

For example, if the programmer had used an exclusive load instruction to load the data value at address [R(x)], the processor that executes the instruction would invalidate all other cached copies of the instruction in other processors or bus masters in the computer system. These other processors or bus masters must then wait until the latest version of the data value can be re-accessed in a shared memory location and re-loaded into the local caches of the processors or bus masters. The time delay associated with this wait can reduce the processing speed of the computer system. In accordance with an embodiment of the present invention, bringing the data value into the local cache of the processor in a shared state using the shared load instruction eliminates this wait because the locally cached copies of the data value are not invalidated. As a result, the speed of the computer system is increased.

Figure 3:
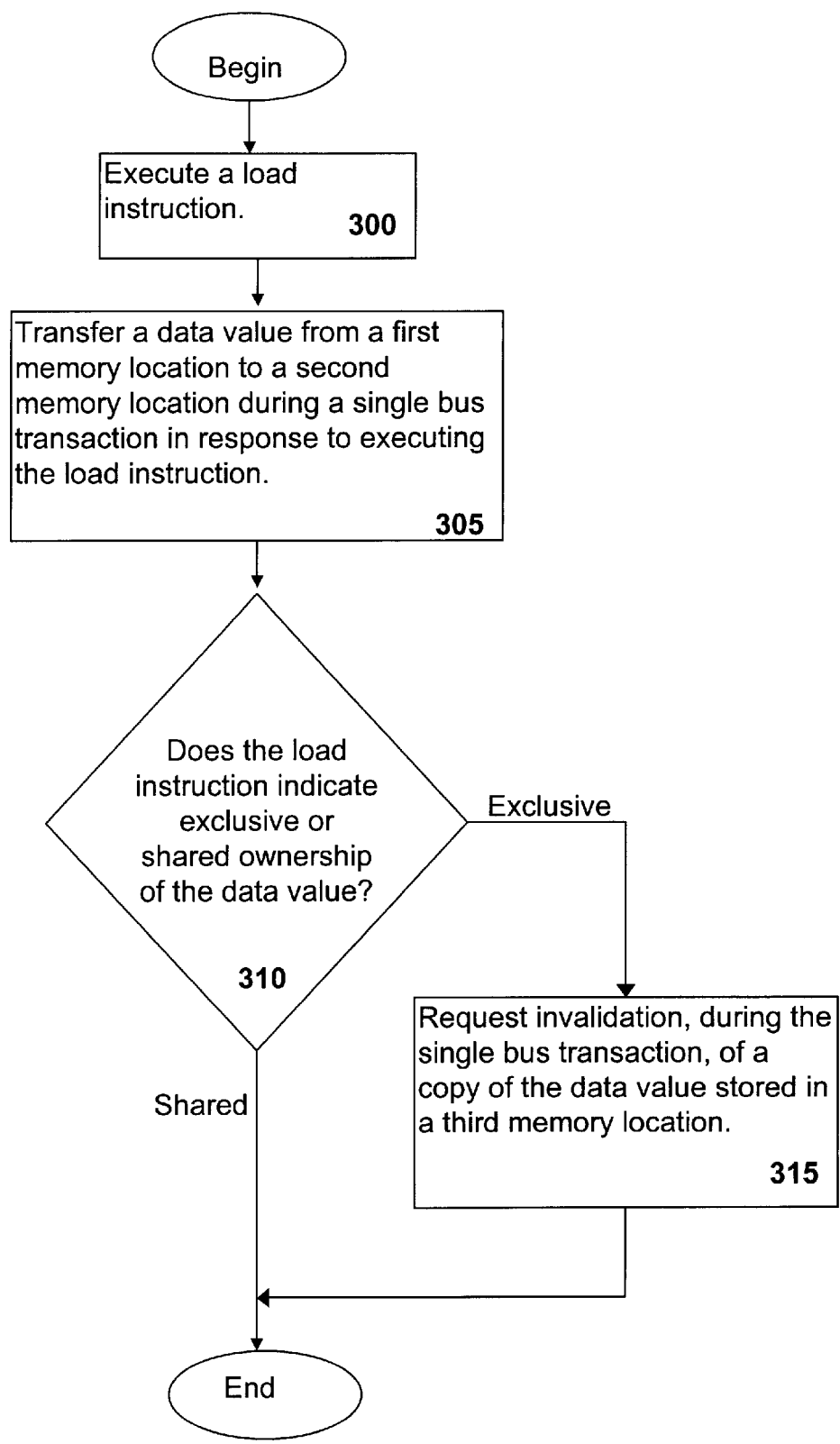
FIG. 3 is a flow chart showing a method of the present invention.

FIG. 3 is a flow chart showing a method of the present invention implemented on a computer system. At step 300 an exclusive load instruction is executed. As used herein, an instruction is said to instruct a processor to perform a particular function if, upon execution of the instruction, the processor performs that function.

At step 305 of FIG. 3, a data value is transferred from a first memory location to a second memory location during a single bus transaction in response to executing the load instruction. At step 310 is determined if the load instruction is an exclusive load instruction, indicating that a request for invalidation of a copy of the data value be made, or is a shared load instruction. If the load instruction indicates shared ownership, the load instruction is completed.

If the load instruction indicates exclusive ownership, an invalidation request is made during the single bus transaction at step 315, requesting invalidation of a copy of the data value stored in a third memory location. In accordance with one embodiment of the present invention, this request is broadcast over a system bus to other processors in a multi-processor computer system. For another embodiment, this request is broadcast over a peripheral bus to peripheral devices including, for example, a bus master. For another embodiment, the request is sent across a dedicated side-band signal line (a point-to-point interconnect line) to other devices in the computer system. In response to this request, copies of the data value that are stored in local caches or other memory spaces of these devices are invalidated.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A method of manipulating data in a computer system, the method comprising:
    executing a load instruction;
    requesting ownership of a bus;
    transferring a first data value from a first memory location to a second memory location via the bus during a single bus transaction in response to executing the load instruction; and
    requesting invalidation, during the single bus transaction, of a copy of the first data value stored in a third memory location, thereby allowing the first data value to be placed in an exclusive state in the second memory location without re-requesting ownership of the bus, if the load instruction indicates to do so.

2. The method of claim 1, further comprising:
    modifying the first data value to create a modified data value; and
    storing the modified data value in the second memory location.

3. The method of claim 1, further comprising transferring a second data value from a fourth memory location that is in the same page as the first memory location to a fifth memory location in a shared state.

4. The method of claim 3, wherein the load instruction indicates to request the invalidation if the load instruction is an exclusive load instruction, and the load instruction indicates to transfer the second data value in a shared state if the load instruction is a shared load instruction.

5. The method of claim 1, wherein the load instruction indicates to request the invalidation if the load instruction is an exclusive load instruction.

6. The method of claim 1, wherein transferring the first data value includes transferring the first data value from a first cache to a second cache, the second cache being a local cache in a processor of the computer system.

7. The method of claim 1, wherein transferring the first data value includes transferring the first data value from a first cache to a second cache, the second cache being a first local cache in a first processor of a multi-processor computer system, and further comprising invalidating, in response to requesting invalidation, a copy of the first data value stored in a second local cache in a second processor of the multi-processor computer system.

8. The method of claim 3, wherein transferring the first data value includes transferring the first data value from a first cache to a second cache, the second cache being a first local cache in a first processor of a multi-processor computer system, transferring the second data value transfers the second data value from the first cache to the second cache, and further comprising invalidating, in response to requesting invalidation, a copy of the first data value stored in a second local cache in a second processor of the multi-processor computer system.

9. The method of claim 1, wherein transferring the first data value includes transferring the first data value from a first cache to a second cache, the second cache being a first local cache in a first processor of the computer system, and further comprising invalidating, in response to requesting invalidation, a copy of the first data value stored in a bus master of the computer system.

10. A method of manipulating data in a computer system that includes a first processor, the method comprising:
    executing an exclusive load instruction that instructs the first processor to, during a single bus transaction, cause a first data value to be transferred from a shared memory location to a first local cache of the first processor in an exclusive state, thereby circumventing placing the first data value in a shared state in the first local cache; and
    executing a store instruction that instructs the first processor to store a modified version of the first data value in the first local cache.

11. The method of claim 10, further comprising executing a shared load instruction that instructs the first processor to cause a second data value from a memory location that is in the same page as the shared memory location to be transferred to the first local cache in a shared state.

12. The method of claim 10, wherein executing an exclusive load instruction instructs the first processor to, during the single bus transaction, cause a copy of the first data value stored in a second local cache in a second processor of a multi-processor computer system to be invalidated.

13. The method of claim 10, wherein executing an exclusive load instruction instructs the first processor to, during the single bus transaction, cause a copy of the first data value stored in a bus master of the computer system to be invalidated.

14. A processor having an instruction set associated therewith, the instruction set including a first load instruction that, when executed by the processor, causes the processor to:

request ownership of a bus;

transfer a first data value from a first memory location to a second memory location, via the bus, during a single bus transaction; and request, during the single bus transaction, invalidation of a copy of the first data value stored in a third memory location, thereby allowing the first data value to be placed in an exclusive state in the second memory location without re-requesting ownership of the bus.

15. The processor of claim 14, wherein the instruction set further includes a second load instruction that, when executed by the processor, causes the processor to transfer a second data value to a fifth memory location in a shared state from a fourth memory location that is in the same page as the first memory location.

16. The processor of claim 15, wherein the second and fifth memory locations are a first local cache in the processor.

17. The processor of claim 14, wherein the first memory location is a shared cache and the second memory location is a first local cache in the processor.

18. The processor of claim 14, wherein the first memory location is a shared cache, the second memory location is a first local cache in the processor, and the third memory location is a second local cache in a second processor.

19. The processor of claim 14, wherein the second memory location is a first local cache in the processor and the request for the invalidation causes a copy of the first data value stored in a second local cache in a second processor of a multi-processor computer system to be invalidated.

20. The processor of claim 14, wherein the second memory location is a first local cache in the processor and the request for the invalidation causes a copy of the first data value stored in a bus master of a computer system to be invalidated.

* * * * *